United States Patent [19]

Pajes

[11] Patent Number: 4,673,001
[45] Date of Patent: Jun. 16, 1987

[54] SEALING MEMBER FOR A CONNECTION PIECE OR A SIMILAR CONNECTION PART FOR A CONDUIT FOR LIQUID OR GAS ON A CONTAINER

[75] Inventor: Chajkiel Pajes, Västerås, Sweden

[73] Assignee: AB Asea-Atom, Västerås, Sweden

[21] Appl. No.: 781,523

[22] Filed: Sep. 30, 1985

[30] Foreign Application Priority Data

Oct. 1, 1984 [SE] Sweden ............................... 8404897

[51] Int. Cl.$^4$ .............................................. F16L 55/12
[52] U.S. Cl. ......................................... 138/93; 138/89
[58] Field of Search ............................. 138/89, 90, 93; 220/232

[56] References Cited

U.S. PATENT DOCUMENTS 4,482,076 11/1984 Wentzell ........................... 138/93 X
4,483,457 11/1984 Schukei et al. ....................... 138/93

FOREIGN PATENT DOCUMENTS 121172 10/1984 European Pat. Off. .

Primary Examiner—James E. Bryant, III
Attorney, Agent, or Firm—Watson, Cole, Grindle & Watson

[57] ABSTRACT

A sealing member in the form of a plate (15) for a connection piece or a similar connection part for a conduit for liquid or gas on a container comprises a portion with a number of sheet elements (15b–15f) having a shape resembling a U-beam and comprising a web part (15'b–15'f) and flange parts (15"b–15"f). The web part of such a sheet element is arranged to constitute part of the flat sides (18, 19) of the plate, and each flange part of such a sheet element is arranged close to a flange part of an adjoining such sheet element or close to a flange part (15"a–15"g) of another sheet element (15a, 15g) located outside said portion and otherwise comprising a part (15'a, 15'g) arranged to constitute a part of the flat sides of the plate. Flange parts arranged adjacent to each other are connected by a hinge (21) at those edges of the flange parts which are facing away from the flat sides of the plate, the plate thus being foldable. On that flat side (19) of the plate where the flange parts are located, there is fixed a rubber bladder (16) connectible to a pressure medium, the plate being unfoldable by means of said bladder by the supply of a pressure medium to the bladder. In pressurized state the bladder is utilized as a supplementary seal inside the plate in the connection piece. The anchoring of the plate in the connection piece can be strengthened by a mechanical anchoring device arranged inside the bladder in the connection piece.

6 Claims, 6 Drawing Figures

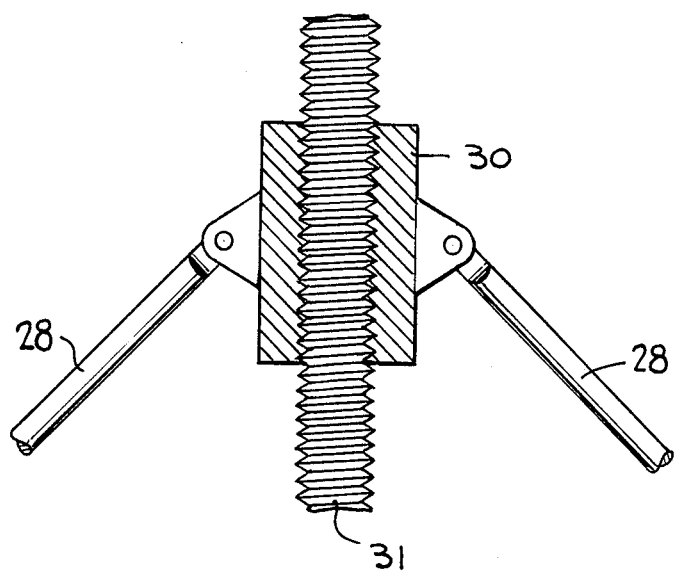
F/G. 6

4,673,001

SEALING MEMBER FOR A CONNECTION PIECE OR A SIMILAR CONNECTION PART FOR A CONDUIT FOR LIQUID OR GAS ON A CONTAINER

BACKGROUND OF THE INVENTION

1. Field of the Invention

The present invention relates to a sealing member in the form of a plate for a connection piece or a similar connection part for a conduit for liquid or gas on a container.

2. The Prior Art

In pressurized water reactors (nuclear power reactors) the steam generator and the reactor vessel are connected to each other in the primary circuit of the reactor. The connection between the steam generator and the reactor vessel normally comprises a connection piece in the form of a nozzle arranged on the steam generator. In connection with maintenance and repair of the steam generator it is of the utmost importance that the nozzle can be effectively sealed so that the reactor vessel is not contaminated by decontamination liquid, washing water, or by solid contaminating materials associated with the cleaning of the steam generator which is then necessary. By sealing the nozzle, emptying of the primary circuit when the above-mentioned operations are to be carried out can also be avoided.

Achieving an efficient sealing of the nozzle on the steam generator constitutes a considerable problem, since the nozzle is not directly accessible from outside. For the sealing of the nozzle it is necessary to employ the manhole of the steam generator, which has a considerably smaller diameter than the nozzle.

From European patent application EP No. 0 121 172 it is known to accomplish the sealing by a foldable plate, which in folded state is passed into the steam generator via the manhole and which is unfolded inside the steam generator. The known plate comprises a number of sheet metal elements of a shape resembling a U-beam, which are arranged adjacent to each other and are interconnected by hinges, in the upper parts of branch parts of the sheet elements making contact with each other.

SUMMARY OF THE INVENTION

The present invention relates to a sealing member having a plate of the above-mentioned kind, for which the unfolding is performed by a special bladder fixed to the plate, by which the plate in folded state can be unfolded by the supply of a gas or a liquid to the bladder. Contrary to the known case, the unfolding of the plate when it is situated in the steam generator can be achieved in a simple manner by a person who is positioned outside the steam generator, which is of the utmost important since the steam generator is normally in a high level radioactive state. In addition, since the bladder constitutes a supplementary sealing, the new sealing member provides an efficient sealing of the steam generator without a pressure having to be exerted on that side of the unfolded plate which faces away from the steam generator, thus preventing contamination of the reactor vessel by a decontamination liquid in connection with the cleaning of the steam generator, as well as preventing leakage from the reactor vessel to the steam generator. Contrary to the prior art nozzle plug, the new nozzle plug can be fixed in the nozzle without having to affect the nozzle, such as drilling holes therein, which is of great importance since such operations will damage the steam generator, for example destroying the rust-protecting layer.

Problems of the kind described above may occur also in other cases than that described above, for example in connection with containers in different plants for chemical processes and containers in different plants for the generation of steam and utilization of its heat contents in plants other than nuclear power plants.

More particularly, the present invention relates to a sealing member in the form of a plate for a connection piece or the like connection part for a conduit for liquid or gas, in which the plate comprises a portion with a number of sheet elements having a shape resembling a U-beam comprising a web part and flange parts, the web part of a sheet element being arranged to constitute a part of the flat sides of the plate and each flange part of a sheet element being arranged adjacent to a flange part of an adjacent sheet element or adjacent to a flange part of another sheet element—located outside the portion—which also comprises a part arranged to constitute part of the flat sides of the plate and whereby flange parts arranged adjacent to each other are connected to each other by a hinge or other pivotal connection at those edges of the flange parts which face away from the flat sides of the plate, so that the plate is foldable. The invention is characterized in that a bladder connectible to a gaseous or liquid medium is fixed to that flat side of the plate on which the flange parts are arranged. The plate can, in folded state, be unfolded by means of the bladder by the supply of gaseous or liquid medium to the bladder and the bladder is arranged in pressurized state to constitute a supplementary seal to the plate in the connection piece or the like connection part for a gas or liquid by being arranged, in pressurized state, to make contact with the walls of the connection piece or the like connection part.

Providing the plate with flange parts and hinges results in the plate being not only foldable but also in the plate being mechanically very strong. The reason is that the flange parts function as load-carrying stiffening means for the plate and can be arranged, where necessary, at a relatively small mutual distance. Furthermore, the hinge ensures that there will be no displacements between the flange parts which are joined by the hinge, and thus also no displacements between the other parts of the sheet elements.

DESCRIPTION OF THE DRAWINGS

The invention will be explained in greater detail by describing an embodiment with reference to the accompanying drawing, wherein

FIG. 6 shows a detail of the anchoring device shown in FIG. 1.

DETAILED DESCRIPTION OF THE PREFERRED EMBODIMENT

Figure 1:
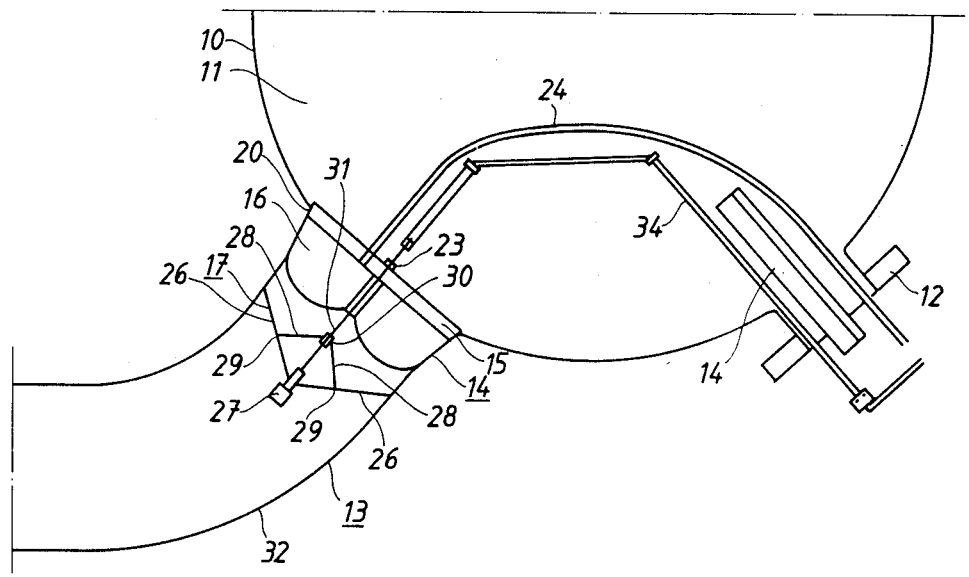
FIG. 1 shows schematically a cross-section of part of a steam generator of a pressurized water reactor having a sealing member according to the present invention in the form of a nozzle plug arranged in a connection piece in the form of a nozzle.

In the part of the steam generator 10 shown in FIG. 1, 11 designates a steam generator chamber, 12 a manhole and 13 a connection piece in the form of a nozzle by way of which the steam generator is connected to the reactor vessel. The figure shows how a sealing member in the form of a nozzle plug 14 for the nozzle, in folded state, is passed through the manhole and how it is subsequently, in unfolded state, arranged in the nozzle. The plate of the nozzle plug is designated 15, its bladder 16 and a mechanical fixing part 17.

Figure 2:
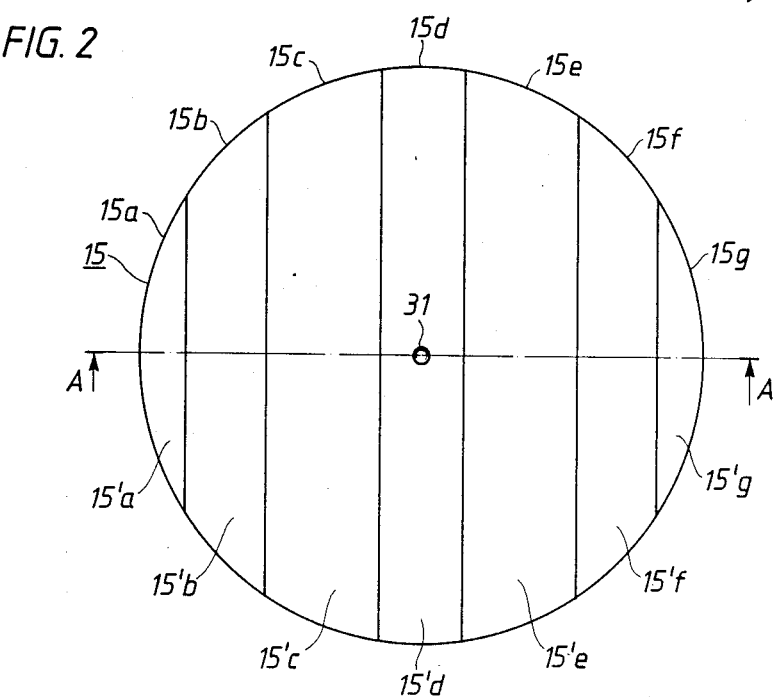
FIG. 2 shows the plate included in the sealing member in unfolded state, seen from above.
Figure 3:
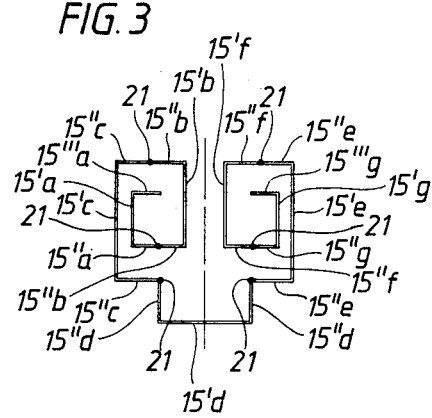
FIG. 3 shows the same plate in folded state in section perpendicular to the flat side of the plate.

As will be clear from FIGS. 2 and 3, the plate 15 consists of a number of sheet elements 15a–g, suitably of stainless steel or aluminium. In that portion of the plate which comprises sheet elements 15b–15f, each sheet element has a shape resembling a U-beam with a web part 15'b–15'f which constitutes a part of the flat sides 18 and 19 (FIG. 5) of the plate and two flange parts 15"b–15"f, which are at least substantially perpendicular to the web parts 15'i b–15'f. In those portions of the plate which comprise sheet elements 15a and 15g, parts 15'a and 15'g constitute jparts of the flat sides of the plate 15. The flange parts 15"a and 15"g are at least substantially perpendicular to the parts 15'a and 15'g and have the same dimensions as the flange parts 15"b and 15"f of the adjacent sheet elements 15b and 15f. The parts 15'''a and 15'''g have an arc-like shape and form parts of the surrounding edge side 20 of the plate 15. They make a slightly acute angle with the parts 15a' and 15g'. Also the sheet elements 15b–15f are provided with edge parts 15'''b–15'''f with an arc-like shape, which make a slightly acute angle with the web parts 15'b–15'f and which similarly constitute parts of the edge side 20 of the plate. The parts 15'''a–15'''g jointly form an edge side on the plate with a slightly conical shape. A sheet element with a U-beam shape, such as each one of the sheet elements 15c, 15d and 15e in the embodiment described, is connected on both sides by means of a hinge 21 to another sheet element with a U-beam shape, namely, 15c to 15b and 14d, 15d to 15c and 15e, and 15e to 15d and 15f, respectively, at those edges of the adjacently located flange parts 15"b, 15"c, respectively, 15"c, 15"d, respectively, 15"d, 15"e, respectively, and 15"e, 15"f, respectively, which face away from the flat sides 18 and 19 (FIG. 5) of the plate. In an analogous manner, the sheet elements 15b and 15f with U-beam shape are connected to the sheet elements 15a and 15g by hinges at those edges of the flange parts 15"b, 15"a and 15"f, 15"g, respectively, which face away from the flat sides of the plate.

Figure 4:
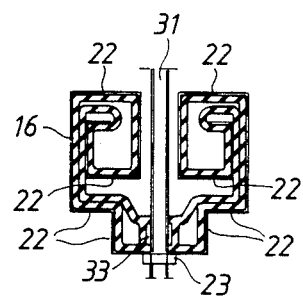
FIG. 4 shows the same section as in FIG. 3 showing additional features of the sealing member.
Figure 5:
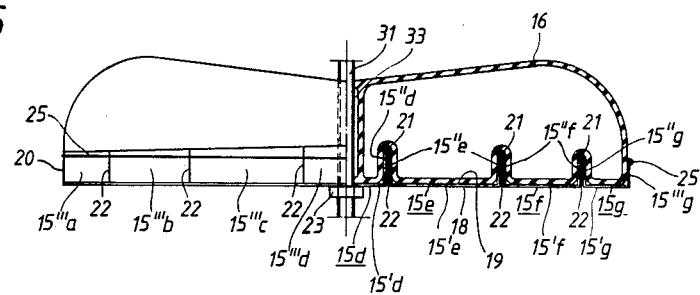
FIG. 5 shows the sealing member according to the invention seen from the side, partially in the section as seen along line 5—5 in FIG. 2

FIG. 4 shows how the bladder 16 of rubber or other similar elastic material is arranged in emptied state inside the folded plate. The bladder is fixed pointwise to a number of the parts 15'a–15'g, preferably to a point in the vicinity of the centre of each such part. The fixing may be carried out by means of a glue or mechanically, for example by metallic pieces being cast into the wall of the bladder and by fixing the bladder via holes in these metallic pieces to the parts of the sheet elements by means of short screws which do not extend through the wall of the bladder inside the metallic pieces. On that surface which is to make contact with a surface of an adjacent flange part in the unfolded plate, each flange part 15"a–15"g is covered by a sealing layer 22 of rubber or a similar material. Further, the nozzle plug is privided with a nut 23 arranged in the centre of part 15'd of the sheet element 15d and a screw 31 is arranged in the nut, the screw 31 extending through the bladder 16 through a space 33 which is blocked from the rest of the bladder. In use of the nozzle plug, it is inserted with the plate 15 in the folded state shown in FIG. 4 through the manhole of the steam generator, as shown in FIG. 1 and mentioned earlier. Thereafter, the plate is unfolded by supplying compressed air to the bladder 16 via a hose 24 without pressurizing the bladder. FIG. 5 illustrates the nozzle plug with the plate 15 in unfolded state. In addition to the parts already described, FIG. 5 shows an O-ring 25, which extends around the edge side 20 of the plate and may be fixed thereto by means of a glue. When the plate has been unfolded, it is moved into and anchored in the nozzle 13 in the manner illustrated in FIG. 1. To facilitate the insertion, that part of the plate which faces the bladder 16 may be formed with resilient guiding arms (not shown), which are provided with ball rollers of a conventional kind. When the nozzle plug has been brought into its final position with the plate 15 pressed into the nozzle, while effecting an efficient mechanical sealing of the nozzle, the bladder 16 is pressurized with compressed air or any other suitable gas, or possibly with a suitable liquid. This also results in an efficient pneumatic sealing of the nozzle.

The anchoring of the nozzle plug in the nozzle can be achieved with the aid of a mechanical anchoring device 17 arranged in the nozzle. In the exemplified case this device comprises three stays 26 which are fixed to pivotal connections at the top 27 of the anchoring device, three stays 28 which are fixed to pivotal connections at the points 29 of the stays 26 and to pivotal connections on an internally threaded ring or sleeve 30 and the previously mentioned screw 31, the upper part of which is freely rotatable in a hole at the top 27 and which runs in the threads on the nut 23 and the ring 30. The stays 26 are pessed against the walls 32 of the nozzle, and the plate 15 is displaced towards the interior of the nozzle when the screw 31 is turned. The tightening of the screw can be performed outside the steam generator by an articulated bolt tightener 34 or a bolt tightener with a flexible shaft in the form of a strong wire, the bolt tightener being extended through the manhole.

I claim:
1. A foldable sealing device which, when in an unfolded condition, can be used to seal the interior of a connection piece that is attached to a steam generator in a nuclear power plant and which, when in a folded condition, can be inserted into the steam generator through a manhole leading therein, said sealing device comprising a plurality of interconnected sheet elements, each sheet element including (1) a generally flat web part which defines a first surface, a second surface, at least one inner side edge and at least one outer side edge, and (2) an inner flange part which is connected to each inner side edge of said web part, each inner flange part extending generally perpendicularly with respect to said web part and away from said second surface thereof, hinge means connected the adjacent flange parts of adjacent sheet elements such that said sheet elements can be pivoted relative to one another to cause the foldable sealing device to be in either a folded or an unfolded condition, the web parts of the sheet elements being shaped such that, when said sheet elements are pivoted relative to each other such that the foldable sealing device is in an unfolded condition, the first surface thereof will be aligned to form a generally flat surface, and a bladder fixedly attached to the second surfaces of the web parts of said sheet elements, said bladder being inflatable to (a) cause said sheet elements, when the foldable sealing device is in a folded condition, to pivot relative to one another, thus causing the foldable sealing device to unfold into an unfolded condition, and (b) make contact with the wall of the connection piece and seal thereagainst when the foldable sealing device is positioned therein in an unfolded condition such that the flat surface thereof faces the steam generator.

2. The foldable sealing device as defined in claim 1, wherein each sheet elements includes an outer flange part connected to each outer side edge of the web part thereof, each outer flange part extending away from the second surface of the web part, the outer flange parts of said plurality of sheet elements cooperating to provide a side portion of the foldable sealing device when the sealing device is in an unfolded condition.

3. The foldable sealing device as defined in claim 2, wherein said outer flange parts extend at an actute angle relative to said flat web parts.

4. The foldable sealing device as defined in claim 1, wherein said plurality of sheet elements includes a central sheet element which includes a hole in the center of the web part thereof; wherein said bladder includes a sealed channel extending therethrough in alignment with said hole; and wherein said foldable sealing device includes a screw which extends through said hole and said sealed channel, said screw having a first portion which extends beyond said web part and a second portion which extends beyond said bladder, an internally threaded sleeve attached to the second portion of said screw, a plurality of stays attached to said sleeve and the second portion of the screw, and a nut attached to the first portion of said screw to control the opening and closing of said stays.

5. The foldable sealing device as defined in claim 1, wherein each inner flange part of each sheet element has an abutment surface which, when said folded sealing device is in an unfolded condition, abuts in abutment surface of an inner flange part of an adjacent sheet element, and including a layer of sealing material on the abutment surface of each inner flange part.

6. The foldable sealing device as defined in claim 5, wherein each layer of sealing material consists of a layer of rubber.

* * * * *